Figure 1:
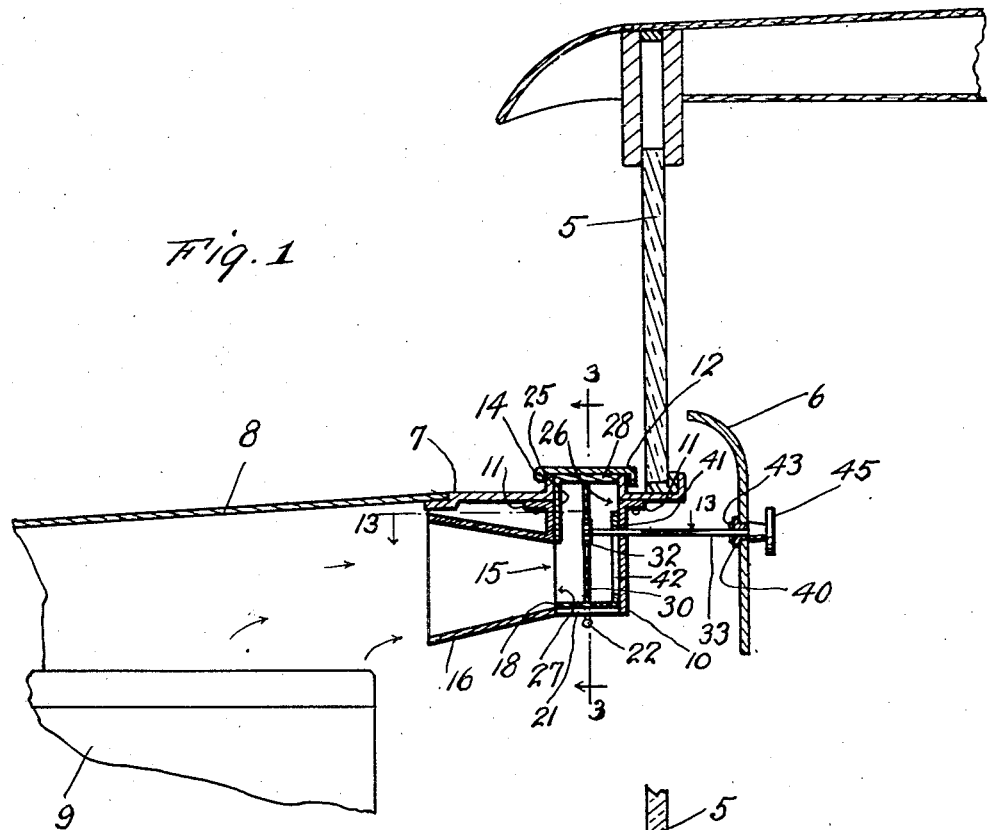

Oct. 14, 1930. O. L. SCHANBACHER 1,778,278
WINDSHIELD HEATER
Filed Feb. 24, 1930 4 Sheets-Sheet 1

Inventor
O. L. Schanbacher
By Clarence A. O'Brien
Attorney

Oct. 14, 1930.    O. L. SCHANBACHER    1,778,278
WINDSHIELD HEATER
Filed Feb. 24, 1930    4 Sheets-Sheet 2

Inventor
O. L. Schanbacher
By Clarence A. O'Brien
Attorney

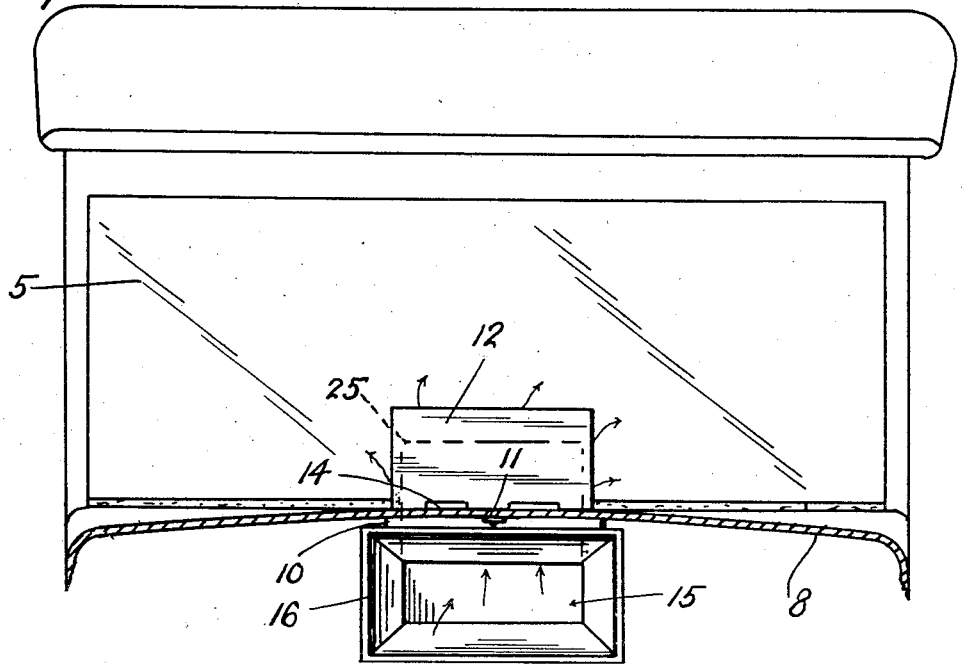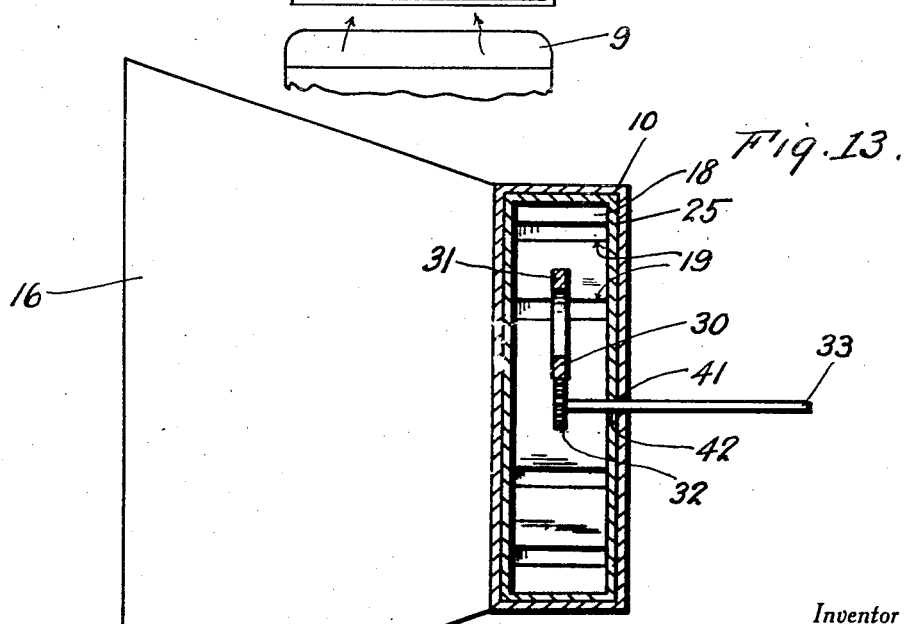

Oct. 14, 1930.          O. L. SCHANBACHER          1,778,278
                          WINDSHIELD HEATER
                     Filed Feb. 24, 1930          4 Sheets-Sheet 4
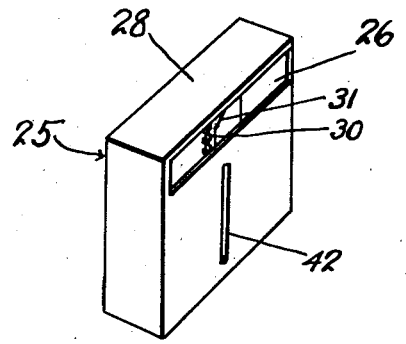
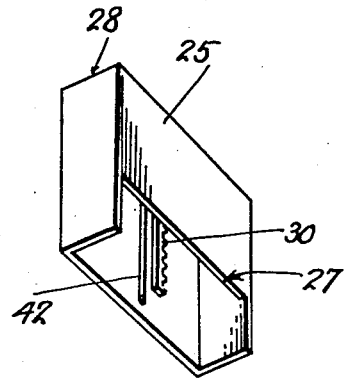
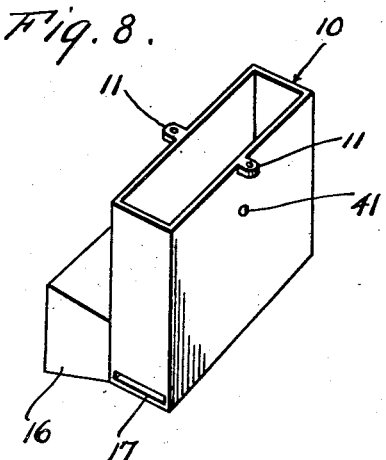
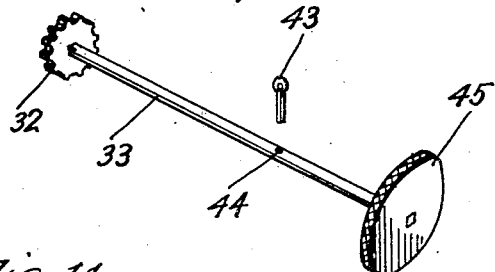
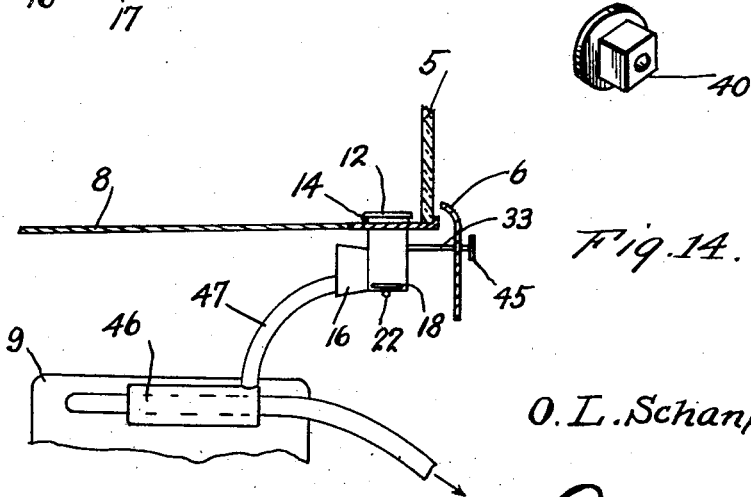
Inventor
O. L. Schanbacher
By Clarence A. O'Brien
Attorney Patented Oct. 14, 1930

1,778,278

UNITED STATES PATENT OFFICE

ORVILLE L. SCHANBACHER, OF MANSFIELD, PENNSYLVANIA

WINDSHIELD HEATER

Application filed February 24, 1930. Serial No. 431,011.

The present invention relates to a windshield heater and has for its prime object to provide an apparatus which may be built into an automobile or the like whereby heated air from the engine may be deflected on to the outside of the windshield to prevent the formation of ice on the windshield in snowy and rainy weather.

Another very important object of the invention resides in the provision of an apparatus of this nature including means whereby the heated air may be also allowed to pass into the interior of the car.

A still further very important object of the invention resides in the provision of an apparatus of this nature which is simple in its construction, inexpensive to manufacture and install, easy to manipulate, compact and convenient in its arrangement of parts, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
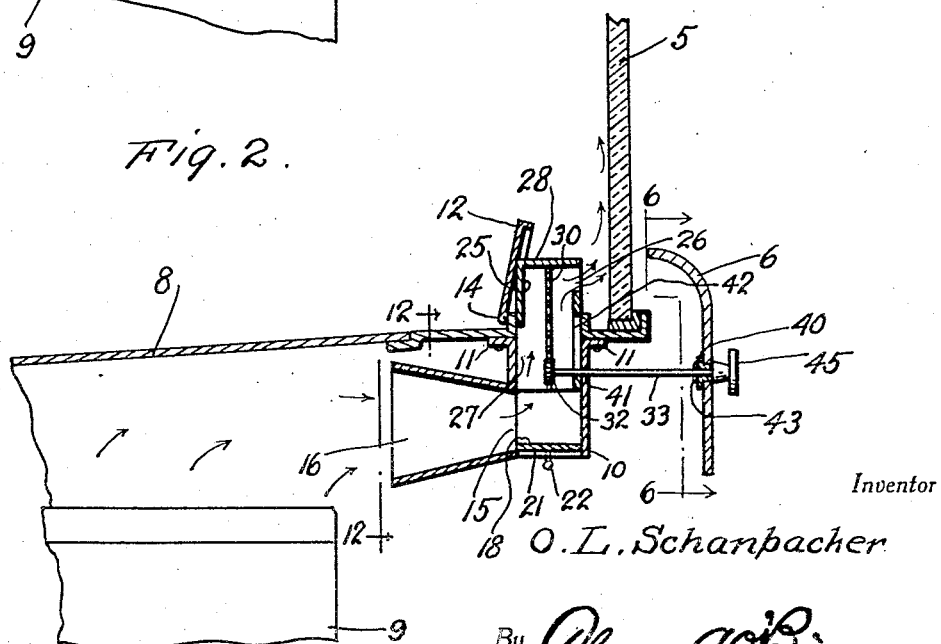
Figure 3:
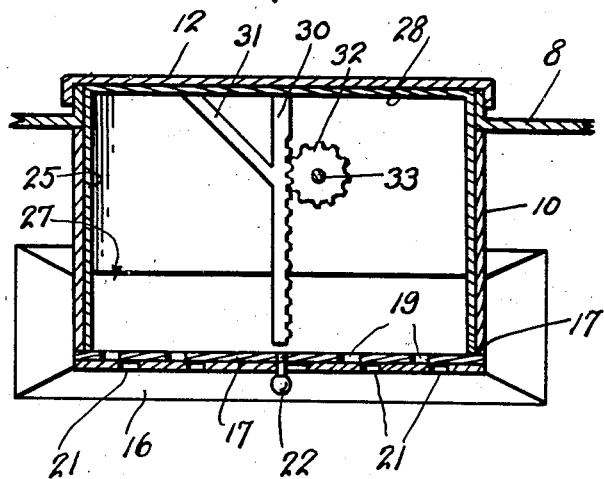
Figure 5:
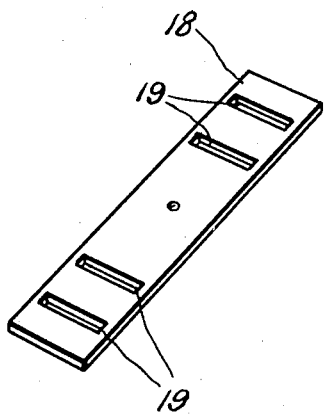
Figure 4:
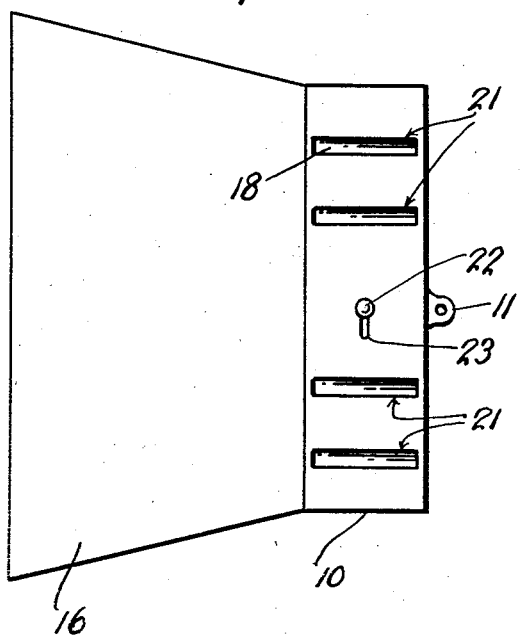
Figure 6:
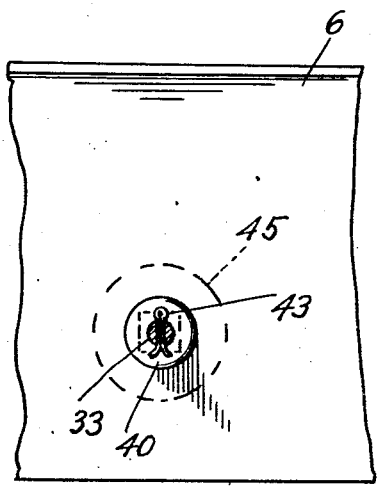

In the drawing:

Figure 1 is a fragmentary longitudinal section through the hood, cowl and windshield of an automobile showing my apparatus in section mounted therein in a closed position, Figure 2 is a similar view showing the apparatus in an open position, Figure 3 is a sectional view taken substantially on the line 3—3 of Figure 1, Figure 4 is a bottom plan view of the apparatus, Figure 5 is a perspective view of the regulator plate, Figure 6 is an enlarged detail section taken substantially on the line 6—6 of Figure 2, Figure 7 is a perspective view of the movable box like section, Figure 8 is a perspective view of the stationary box like structure, Figure 9 is a view similar to Figure 7 showing the box like structure in another position, Figure 10 is a perspective view of the operating shaft and associated parts, Figure 11 is a perspective view of a bearing for the shaft, Figure 12 is a vertical transverse section taken substantially on the line 12—12 of Figure 2, Figure 13 is a horizontal section taken substantially on the line 13—13 of Figure 1, and Figure 14 is a side elevation of another embodiment of the invention.

Referring to the drawing in detail it will be seen that numeral 5 denotes a windshield, numeral 6 an instrument board, numeral 7 a cowl, numeral 8 a hood, and numeral 9 an engine, all of these parts being conventional in an automobile and illustrated herein to exemplify the utility of my improved apparatus.

The numeral 10 denotes a rectangular box like structure open at the top and bottom and having projecting from its upper edges ears 11 to be secured under the cowl 7 under an opening therein which is closable by a lid 12 hingedly mounted as at 14. An opening 15 is formed in the bottom of the front wall of the box like structure 10 and a funnel 16 projects forwardly therefrom to receive the hot air created by the engine 9 so as to deliver this hot air into the box like structure.

The bottom of the ends of the box like structure 10 are provided with slots 17. A plate 18 is slidable through the slot 17 and has openings 19. A bottom plate 20 is mounted on the bottom of the box like structure 10 and has openings 21. A knob 22 connected with the center of the plate 18 projects through a slot 23 in the plate 20 so that the plate 18 may be shifted to register and unregister the openings 19 with respect to the openings 21.

When the openings 19 are registered with the openings 21, the heated air may pass back into the car as will be quite apparent.

A movable box like structure 25 is telescoped in the box like structure 10 and the upper portion of the rear wall of this box like structure 25 has an elongated rectangular opening 26 formed therein which is the outlet opening and the bottom of the front wall is provided with an opening 27 which is the inlet opening.

There is no bottom to the box like structure 25 but it is provided with a top 28. A rack bar 30 depends from the top 28 being braced in respect thereto by means of a brace 31. A rack gear 32 on its shaft 33 meshes with the rack bar 30 so that by turning the shaft 33 the movable box like structure 5 may be raised out of the stationary box like structure 10 that is may be moved from the position shown in Figure 1 to the position shown in Figure 2 and when in this position shown in Figure 2 it will be seen that the hot air will pass from the stationary box like structure up through the movable box like structure, out through the opening 26 onto the windshield 5 to prevent the formation of ice thereon.

A bearing 40 is mounted in the instrument board 6 and the shaft 33 is journalled therethrough. This shaft 33 is also journalled through an opening in the rear wall of the like structure 10, the opening being denoted by the numeral 41 and of course a slot 42 is formed in the rear wall of the box like structure 25 through which the shaft extends. A cotter pin 43 is insertable through an opening 44 in an intermediate portion of the shaft 33 so as to prevent longitudinal movement of the shaft inwardly of the automobile.

A knob structure 45 is provided on the rear end of the shaft 33 and has a hub portion to engage the bearing 40 to prevent movement of the shaft forwardly.

In Figure 14 I have shown another embodiment of the invention wherein a stove 46 is disposed about the exhaust manifold of the engine and a conduit 47 leads from the stove to the funnel 16.

It is thought that the construction, operation, utility and advantages of this invention will now be quite apparent to those skilled in this art without a more detailed description thereof.

The present embodiment of the invention has been disclosed in considerable detail merely for the purposes of exemplication since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An apparatus of the class described comprising a stationary box like structure having a funnel leading into the lower portion thereof, a movable box like structure telescoped in the stationary box like structure and having one of its walls formed with an opening, a vertically disposed rack bar in the movable box like structure, a rack gear meshing therewith, a shaft journalled through an opening in the stationary box like structure and extending through a slot in the movable box like structure, said gear being mounted on said shaft.

2. An apparatus of the class described comprising a stationary box like structure having a funnel leading into the lower portion thereof, a movable box like structure telescoped in the stationary box like structure and having one of its walls formed with an opening, a vertically disposed rack bar in the movable box like structure, a rack gear meshing therewith, a shaft journalled through an opening in the stationary box like structure and extending through a slot in the movable box like structure, said gear being mounted on said shaft, a bottom plate across the bottom of the stationary box like structure and being formed with openings, a plate having openings slidable on the bottom plate, and means for shifting the slidable plate to register and unregister its openings with respect to the openings in the bottom plate.

3. In combination with an automobile; wherein the automobile comprises a windshield, a cowl having an opening therein, a hood, and an engine; a heating apparatus comprising a box like structure under the cowl registering with the opening therein, a second box like structure telescoped in the first box like structure and slidable in the opening, said first box like structure having an opening in the front wall thereof, a funnel projecting forwardly from the opening, said second box like structure having an open bottom and a closed top and being formed with an opening in its rear wall at the top thereof, and means for moving the second box like structure up and down.

4. In combination with an automobile; wherein the automobile comprises a windshield, a cowl having an opening therein, a hood, and an engine; a heating apparatus comprising a box like structure under the cowl registering with the opening therein, a second box like structure telescoped in the first box like structure and slidable in the opening, said first box like structure having an opening in the front wall thereof, a funnel projecting forwardly from the opening, said second box like structure having an open bottom and a closed top and being formed with an opening in its rear wall at the top thereof, and means for moving the second box like structure up and down, a rack bar depending from the top of the second box like structure, a shaft journalled through the rear of the first box like structure extending through a vertical slot in the rear wall of the second box like structure, a rack gear on the shaft meshing with the rack bar.

In testimony whereof I affix my signature.

ORVILLE L. SCHANBACHER.